United States Patent Office 3,364,117
Patented Jan. 16, 1968

3,364,117
VACCINE FOR COMBATING *SALMONELLA CHOLERAESUIS* INFECTION

Herbert Williams Smith, Stock, England, assignor to National Research Development Corporation, London, England, a British corporation No Drawing. Filed Sept. 9, 1964, Ser. No. 395,313
Claims priority, application Great Britain, Sept. 10, 1963, 35,721/63
8 Claims. (Cl. 167—78)

ABSTRACT OF THE DISCLOSURE

A vaccine for combating *Salmonella choleraesuis* infection is prepared using the attenuated variant of *Salmonella choleraesuis* having the A.T.C.C. deposit number 15478 or 15479. The variant, obtained by repeatedly selecting and growing rough colonies of *Salmonella choleraesuis*, is stable, non-pathogenic to pigs and can be freeze-dried for storage without modifying its activity. It is used as a live vaccine in aqueous suspension.

This invention relates to vaccines and more particularly to a vaccine for the prevention of *Salmonella choleraesuis* infection (paratyphoid) in pigs.

Paratyphoid is a bacterial infection which affects pigs usually when they are about two to four months old. The disease may spread rapidly through a herd and is often fatal, or in cases where the animal survives, causes such emaciation that the animal must be destroyed. It has been the practice in the past to treat outbreaks of the disease with anti-biotics but this is not always satisfactory and hence there is a need for some prophylactic measure against paratyphoid.

*Salmonella choleraesuis*, in common with many other micro-organisms, is known to exist in rough and smooth forms and the search for suitable strains of organisms for vaccine purposes has concentrated on the rough forms. However, a very large number of rough colonies which have been selected from the bacterial growths have been found to be unsuitable. Rough colonies have been frequently rejected for vaccine purposes because perhaps the rough forms are too virulent and cause unacceptable disease symptoms in the animal or because they do not provoke a sufficient anti-body response or because they are insufficiently stable and revert in vivo to more virulent forms.

Two distinct selection processes have been used in attempts to obtain rough strains of *Salmonella choleraesuis* suitable for the production of vaccines. These are visual selection and phase selection and each of these methods has led after much experimentation to the isolation of a rough form which is suitable for vaccine production. This suitability is based on an acceptable combination of apathogenicity for pigs, immunogenicity and stability. These two rough forms, originally designated V3 and V6, respectively, have been deposited in the American Type Culture Collection in Maryland, U.S.A. and have deposit numbers A.T.C.C. 15478 and A.T.C.C. 15479 respectively.

The present invention provides a vaccine composition comprising the attenuated strain of *Salmonella choleraesuis* having the deposit number A.T.C.C. 15478 or A.T.C.C. 15479 and a pharmaceutically acceptable diluent. The composition is preferably in the form of an injectable vaccine which may be formulated using freeze dried organisms. The invention accordingly includes a freeze dried culture of the Salmonella organism A.T.C.C. 15478 or 15479.

An injectable vaccine may be made up from the freeze dried organisms using an injectable diluent to provide a vaccine composition containing $10^8$ to $10^9$ viable bacteria per ml. of vaccine. A vaccine composition containing a bacterial concentration of this order has been found convenient for the vaccination of eight week old pigs where a single dose of 1–10 mls. can be used. Such compositions may be prepared in a unit dosage from where each unit contains $10^8$ to $10^9$ viable bacteria.

The Salmonella vaccine may be made up using any of the injectable diluents in common use in the veterinary field such as sterile, distilled water, saline or phosphate buffer solutions. Such formulations are conveniently prepared using the freeze dried bacteria, but is is not essential to use the organisms in this condition. It is possible to harvest the organisms from an ordinary culture, e.g., a liquid broth culture or a nutrient agar culture and to resuspend it in diluents such as those mentioned above. It is also possible to utilise a broth culture of the organisms directly as a vaccine provided the obvious precautions regarding sterility, etc., are taken and very satisfactory results have been obtained using such vaccines on a modest scale in the field.

Although positive results have been obtained by oral administration of the vaccine in mice the preferred method of application is by parenteral administration and subcutaneous injection has been found particularly valuable for combating *Salmonella choleraesuis* infection in pigs.

The following examples serve to describe the invention further and to illustrate the visual and phage methods for the selection of rough colonies for vaccine production.

*Example 1*

A culture of *Salmonella choleraesuis*, isolated from the organs of a pig which had died from paratyphoid, is inoculated into 20 mls. of a sterile nutrient broth. The broth is made from a proprietary concentrate (Oxoid No. 1, formula CM67) and contains "Lab Lemco" beef extract 1 g./l., yeast extract (Oxoid L20) 2 g./l., peptone (Oxoid L37) 5 g./l. and sodium chloride 5 g./l. The pH is approximately 7.4. The strain is grown in the broth at about 18° C. for 3–10 days and then about 0.1 ml. of liquid withdrawn and inoculated into a further 20 mls. of nutrient broth. This sub-culturing is repeated eleven times with a culture temperature of about 15° C. and culture time of 6–20 days. The final sub-culture is streaked on to a nutrient agar containing the same nutrients as the broth together with 15 g./l. agar which is then incubated at 37° C. for 24 hours and a rough colony selected visually for vaccine production. This selection, although subjective, is based on the morphological characteristics of the organisms under observation and the selected colony is shown to be rough by the slide acraflavine test (Braun and Bonestell 1947, Amer. J. Vet. Res., 8, 386).

This selected colony is then plated out five times on a beef extract/yeast extract/peptone sodium chloride agar, a single colony being selected on each occasion for further culture. These organisms selected from the fifth agar plate are the stable organisms deposited at the A.T.C.C. under the deposit number 15478. The organisms have also been described for laboratory purposes as V3. Its suitability for vaccine purposes is determined by an assessment of the attenuation, stability and immunogenicity on mice.

The organisms from the fifth agar plate have been freeze dried by culturing on an agar slope for 24 hours at 37° C., suspending a sample of the bacteria in Mist. desiccands (glucose and horse serum) to give a thick suspension and drying the suspension in a commercial freeze drying machine. A.T.C.C. 15478 may also be preserved by culturing on a Dorset Egg medium for 24 hours at 37° C. and thereafter maintaining the culture at 5° C.

Freeze dried organisms may be suspended in sterile distilled water to give an injectable vaccine. The organisms from the fifth plate have also been cultivated in the sterile nutrient broth mentioned above at 37° and the 24-hour nutrient broth containing approximately $5 \times 10^8$ viable bacteria per ml. used for direct vaccination of pigs as described below.

A 24-hour broth culture of A.T.C.C. 15478 consists of a powdery deposit and a clear supernatant fluid. A suspension of the organism in normal salines agglutinates immediately and completely when submitted to the slide acraflavine test and agglutinates slowly in normal saline.

Colonial growth of A.T.C.C. 15478 on desoxycholate-citrate agar is smaller than that of the parent virulent strain from which it is derived, after 24 hours growth at 37° C. the colony diameters were 1 mm. and 2 mm. respectively while after 48 hours at 37° C. the A.T.C.C. 15478 colonies had a "poached egg" appearance and a diameter of about 1.5 mm. and the parent strain colonies were flat with an uneven edge with a diameter of 3–4 mm. This difference in appearance is of considerable value in distinguishing the vaccine strain from the virulent strain.

*Example 2*

A culture of the fully virulent *Salmonella choleraesuis* strain described in Example 1 is grown in the nutrient broth described in Example 1 at 37° C. for 24 hours. The nutrient broth culture is then spread over a plate of the nutrient agar mentioned in Example 1 and when dry a drop of Salmonella anti-O phage No. 1 suspension (Felix and Callow, 1943, British Medical Journal, 2, 127) placed on it. The plate is then incubated at 37° C. for 24 hours after which time complete lysis has occurred in the area in which the phage had been applied. Several phage resistant colonies are found to be growing in this area however and these are shown to be rough by the acraflavine test.

One of these rough colonies, is then plated out five times on a peptone agar, a single colony being selected on each occasion for further culture. The organisms selected from the fifth agar plate are the stable organisms deposited at the A.T.C.C. under the deposit number 15479. These organisms have also been described for laboratory purposes as V6. Suitability for vaccine purposes is determined by an assessment of the attenuation, immunogenicity and stability in mice.

The organisms from this fifth plating have been freeze dried as described in the previous example and may also be preserved on Dorset Egg medium.

Freeze dried bacteria may be suspended in sterile, distilled water to give an injectable vaccine. A.T.C.C. 15479 has also been cultivated in a sterile peptone broth at 37° C. and the 24-hour nutrient broth containing approximately $5 \times 10^8$ viable bacteria per ml. used for the direct vaccination of pigs as described below.

The characteristics of A.T.C.C. 15479 are similar to those mentioned in the previous example for A.T.C.C. 15478 but the supernatant in the 24 hour broth culture is turbid and the agglutination in normal saline slower. The colonial diameters on desoxycholate-citrate agar are smaller than those of A.T.C.C. 15478, 0.5 mm. and 1 mm. at 24 and 48 hours, respectively, but are of similar appearance.

In this and the previous example only those process steps resulting in the production of the finally selected vaccine strain are mentioned. It will be appreciated however that a large number of other rough forms obtained by these and similar process steps have been tested but were all rejected as being unsuitable for vaccine purposes.

The vaccines produced in accordance with the methods described in Examples 1 and 2 have been subjected to field trials in pigs which were vaccinated and the efficiency of the vaccine tested by artificial challenge with the virulent organism. The tests were carried out on eight week old Landrace X Large White pigs of both sexes kept under ordinary conditions of management and fed on proprietory pig meal ad lib. The pigs were vaccinated with a single subcutaneous 5 ml. injection of the 24-hour nutrient broth vaccine containing approximately $5 \times 10^8$ viable bacteria per ml. as described in the examples. The vaccine was then challenged three weeks after vaccination by oral administration of the virulent organism.

The body temperature, appetite and general appearance of the pigs was recorded before and after vaccination and before and after challenge and the animals examined for lesions. The liver and frequently other organs from pigs that died were examined bacteriologically to confirm that they had died from the Salmonella organism with which they had been challenged. The pigs were examined for 14 days after challenge at which time the survivors had either recovered almost completely or, in the case of the unvaccinated pigs, were so emaciated that destruction was necessary. The detailed results of these tests on 36 pigs are shown in the following table:

| Vaccine | Number of pigs used | Cumulative mortality on the following days after challenge | | | | | | | | | Number of survivors | | |
|---|---|---|---|---|---|---|---|---|---|---|---|---|---|
| | | 5 | 6 | 7 | 8 | 9 | 10 | 11 | 12 | 13 | With severe lesions | With mild lesions | With no lesions |
| A.T.C.C. 15478 | 12 | 0 | 0 | 0 | 1 | 1 | 1 | 1 | 1 | 1 | 0 | 0 | 11 |
| A.T.C.C. 15479 | 12 | 0 | 0 | 0 | 0 | 0 | 0 | 0 | 0 | 0 | 0 | 1 | 11 |
| None | 12 | 1 | 2 | 2 | 2 | 3 | 4 | 4 | 4 | 7 | 4 | 0 | 1 |

I claim:

1. A freeze dried culture of the attenuated strain of *Salmonella choleraesuis* having the American Type Culture Collection reference number 15479.

2. A vaccine composition comprising the attenuated strain of *Salmonella choleraesuis* having the American Type Culture Collection reference number 15479 and a pharmaceutically acceptable diluent.

3. An injectable composition in unit dosage form comprising the attenuated strain of *Salmonella choleraesuis* having the American Type Culture Collection reference number 15479 and a pharmaceutically acceptable diluent, the number of viable bacteria in the unit being from $10^8$ to $10^9$.

4. A method of combating *Salmonella choleraesuis* infection in pigs comprising administering by injection to the animal a vaccine containing the attenuated strain of *Salmonella choleraesuis* having the American Type Culture Collection reference number 15479 and a pharmaceutically acceptable diluent.

5. A freeze dried culture of the attenuated strain of *Salmonella choleraesuis* having the American Type Culture Collection reference number 15478.

6. A vaccine composition comprising the attenuated strain of *Salmonella choleraesuis* having the American Type Culture Collection reference number 15478 and a pharmaceutically acceptable diluent.

7. An injectable composition in unit dosage form comprising the attenuated strain of *Salmonella choleraesuis* having the American Type Culture Collection reference number 15478 and a pharmaceutically acceptable diluent, the number of viable bacteria in the unit being from $10^8$ to $10^9$.

8. A method of combating *Salmonella choleraesuis* infection in pigs comprising administering by injection to the animal a vaccine containing the attenuated strain of *Salmonella choleraesuis* having the American Type Culture Collection reference number 15478 and a pharmaceutically acceptable diluent.

No references cited.

LEWIS GOTTS, *Primary Examiner.*

R. L. HUFF, *Assistant Examiner.*